United States Patent
Wu et al.

(10) Patent No.: US 9,585,204 B2
(45) Date of Patent: Feb. 28, 2017

(54) DRIVING CIRCUIT AND CONTROL METHOD THEREOF

(71) Applicant: LITE-ON TECHNOLOGY CORP., Taipei (TW)

(72) Inventors: Chen-Wei Wu, Taipei (TW); Feng-Hsu Lin, Taipei (TW); Yuan-Lun Chang, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 46 days.

(21) Appl. No.: 14/580,545

(22) Filed: Dec. 23, 2014

(65) Prior Publication Data

US 2016/0181910 A1    Jun. 23, 2016

(51) Int. Cl.
*H05B 37/02* (2006.01)
*H05B 33/08* (2006.01)
*H02M 3/156* (2006.01)

(52) U.S. Cl.
CPC .......... *H05B 33/08* (2013.01); *H02M 3/156* (2013.01)

(58) Field of Classification Search
CPC ................ H05B 33/0815; H05B 33/0818
USPC ........................................................ 315/307
See application file for complete search history.

(56) References Cited

U.S. PATENT DOCUMENTS

| | | | |
|---|---|---|---|
| 9,030,122 B2* | 5/2015 | Yan | H05B 33/0818 315/291 |
| 2012/0049758 A1* | 3/2012 | Hwang | H05B 33/0815 315/291 |
| 2013/0113375 A1* | 5/2013 | Leung | H05B 33/0815 315/85 |
| 2013/0147379 A1* | 6/2013 | Zhou | H05B 33/0815 315/210 |
| 2015/0244273 A1* | 8/2015 | Schaemann | H02M 3/33523 363/21.18 |
| 2015/0264769 A1* | 9/2015 | Jelaca | H05B 33/0845 315/206 |
| 2015/0311803 A1* | 10/2015 | Schaemann | H02M 1/4258 315/210 |
| 2016/0119987 A1* | 4/2016 | Chen | H05B 33/0818 315/224 |

* cited by examiner

*Primary Examiner* — Don Le
(74) *Attorney, Agent, or Firm* — Rosenberg, Klein & Lee (57) ABSTRACT

A driving circuit includes: a switching element having a first terminal to receive an input voltage, and a second terminal; an inductor coupled to the second terminal of the switching element; a switch and a current sensing element coupled in series to the second terminal of the switching element; and a control module compensating a voltage sensed by the current sensing element based on at least one of the input voltage and an output voltage across the switching element and the inductor to generate a compensated signal, and switching the switch from an ON state to an OFF state when the compensated signal exceeds a reference threshold for a delay time.

20 Claims, 9 Drawing Sheets

DRIVING CIRCUIT AND CONTROL METHOD THEREOF

FIELD OF THE INVENTION

This invention relates to driving techniques, and more particularly to a driving circuit and a control method thereof.

BACKGROUND OF THE INVENTION

A conventional inverse buck (also referred to as low-side buck) driving circuit receives an input voltage, and generates an output current to drive a light emitting diode (LED) string. However, it is disadvantageous in that an average of the output current varies greatly depending on the input voltage and an output voltage across the LED string.

SUMMARY OF THE INVENTION

Therefore, an object of this invention is to provide a driving circuit and a control method thereof, that may alleviate the aforesaid drawback associated with the prior art.

According to one aspect of this invention, a driving circuit includes a switching element, an inductor, a switch, a current sensing element and a control module. The switching element has a first terminal adapted to receive an input voltage, and a second terminal. The inductor has a first terminal coupled to the second terminal of the switching element, and a second terminal. The switch and the current sensing element are coupled in series between the second terminal of the switching element and a reference node. The current sensing element senses a current flowing through the switch to generate a sensed voltage. The control module is coupled to at least one of the first terminal of the switching element and the second terminal of the inductor and to the current sensing element and the switch, compensates the sensed voltage from the current sensing element based on at least one of the input voltage and an output voltage across the switching element and the inductor to generate a compensated signal, and switches the switch from an ON state to an OFF state when the compensated signal exceeds a reference threshold for a delay time.

According to another aspect of this invention, there is provided a control method for controlling a driving circuit. The driving circuit includes a switching element, an inductor and a switch that are coupled to each other in a Y shape, and a current sensing element that is coupled to the switch in series and that senses a current flowing through the switch to generate a sensed voltage. The switching element receives an input voltage. The control method includes the steps of: compensating the sensed voltage based on at least one of the input voltage and an output voltage across the switching element and the inductor to generate a compensated signal; and switching the switch from the ON state to the OFF state when the compensated signal exceeds a reference threshold for a delay time.

BRIEF DESCRIPTION OF THE DRAWINGS

Other features and advantages of this invention will become apparent in the following detailed description of the embodiments of this invention with reference to the accompanying drawings, of which.

DETAILED DESCRIPTION OF THE EMBODIMENTS

Before this invention is described in greater detail with reference to the accompanying embodiments, it should be noted herein that like elements are denoted by the same reference numerals throughout the disclosure.

Moreover, it should be noted herein that throughout this disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 1:
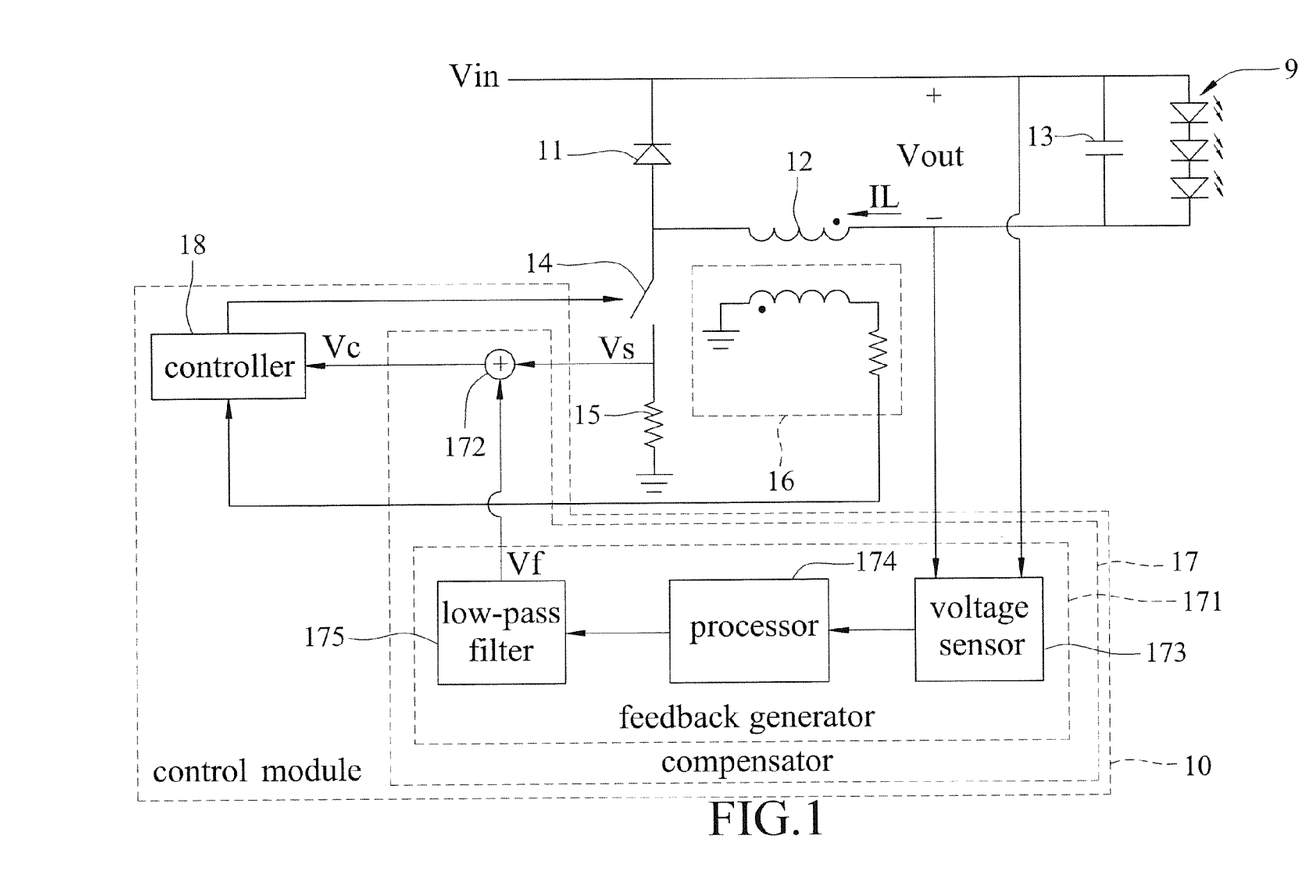
FIG. 1 is a schematic circuit block diagram illustrating a first embodiment and a second embodiment of an inverse buck driving circuit according to this disclosure.

Referring to FIG. 1, a first embodiment of an inverse buck driving circuit according to this disclosure is shown to drive a load 9 (e.g., a light emitting diode string). The inverse buck driving circuit of this embodiment includes a switching element 11, an inductor 12, a capacitor 13, a switch 14, a current sensing element 15, a current sensor 16 and a control module 10.

The switching element 11 has a first terminal adapted to be coupled to the load 9 and to receive an input voltage (Vin), and a second terminal. In this embodiment, the switching element 11 is a diode that has an anode serving as the second terminal of the switching element 11, and a cathode serving as the first terminal of the switching element 11.

The inductor 12 has a first terminal coupled to the second terminal of the switching element 11, and a second terminal adapted to be coupled to the load 9.

The capacitor 13 is coupled between the first terminal of the switching element 11 and the second terminal of the inductor 12 for alleviating ripple effects at the load 9.

The switch 14 and the current sensing element 15 are coupled in series between the second terminal of the switching element 11 and a reference node (e.g., ground), with the switch 14 coupled to the second terminal of the switching element 11 and the current sensing element 15 coupled to the reference node. In other words, the switching element 11, the inductor 12 and the switch 14 are coupled to each other in a Y shape. The current sensing element 15 senses a current flowing through the switch 14 to generate a sensed voltage (Vs) across the current sensing element 15. In this embodiment, the current sensing element 15 is a resistor.

The current sensor 16 senses an inductor current (IL) (i.e., a current flowing through the inductor 12), and generates a sensed signal that indicates this current.

The control module 10 is coupled to the first terminal of the switching element 11, the second terminal of the inductor 12, the switch 14, the current sensing element 15 and the current sensor 16, compensates the sensed voltage (Vs) across the current sensing element 15 based on an output voltage (Vout) across the switching element 11 and the inductor 12 to generate a compensated signal, and controls operation of the switch 14 between an ON state and an OFF state based on the sensed signal from the current sensor 16 and the compensated signal. In this embodiment, the control module 10 includes a compensator 17 and a controller 18.

The compensator 17 is coupled to the first terminal of the switching element 11, the second terminal of the inductor 12 and the current sensing element 15, and compensates the sensed voltage (Vs) across the current sensing element 15 based on the output voltage (Vout) to generate a compensated voltage (Vc) as the compensated signal.

The controller 18 is coupled to the switch 14 and the current sensor 16, has a control pin coupled to the compensator 17 for receiving the compensated voltage (Vc), and controls operation of the switch 14 between the ON state and the OFF state based on the sensed signal from the current sensor 16 and a voltage at the control pin (i.e., the compensated voltage (Vc) in this embodiment). In this embodiment, the controller 18 is a PWM (pulse width modulation) controller configured to switch the switch 14 from the ON state to the OFF state when the voltage at the control pin (i.e., the compensated voltage (Vc) in this embodiment) exceeds a predetermined reference voltage serving as the reference threshold for a delay time, and to switch the switch 14 from the OFF state to the ON state upon being triggered by the sensed signal generated by the current sensor 16. In this embodiment, the controller 18 is configured such that the switch 14 is switched from the OFF state to the ON state when the sensed signal indicates that the inductor current (IL) reduces to zero. As a result, the driving circuit of this embodiment operates in a boundary conduction mode (BCM).

In this embodiment, the compensator 17 includes a feedback generator 171 and a voltage adder 172. The feedback generator 171 is coupled to the first terminal of the switching element 11 and the second terminal of the inductor 12, and generates a DC (direct current) feedback voltage (Vf) based on the output voltage (Vout). The voltage adder 172 is coupled to the current sensing element 15, the feedback generator 171 and the controller 18, and adds up the sensed voltage (Vs) across the current sensing element 15 and the feedback voltage (Vf) from the feedback generator 171 to generate the compensated voltage (Vc) for the controller 18.

In this embodiment, the feedback generator 171 includes a voltage sensor 173, a processor 174 and a low-pass filter 175. The voltage sensor 173 is coupled to the first terminal of the switching element 11 and the second terminal of the inductor 12, and senses the input voltage (Vin) and a voltage at the second terminal of the inductor 12 to generate a first analog signal that indicates the input voltage (Vin) and a second analog signal that indicates the voltage at the second terminal of the inductor 12. The processor 174 is coupled to the voltage sensor 173, and generates a pulse width modulated (PWM) signal based on the first and second analog signals from the voltage sensor 173. The low-pass filter 175 is coupled to the processor 174 and the voltage adder 172, and filters the PWM signal from the processor 174 to generate the feedback voltage (Vf) for the voltage adder 172. The low-pass filter 175 may be an RC low-pass filter, which is relatively low in cost.

Figure 2:
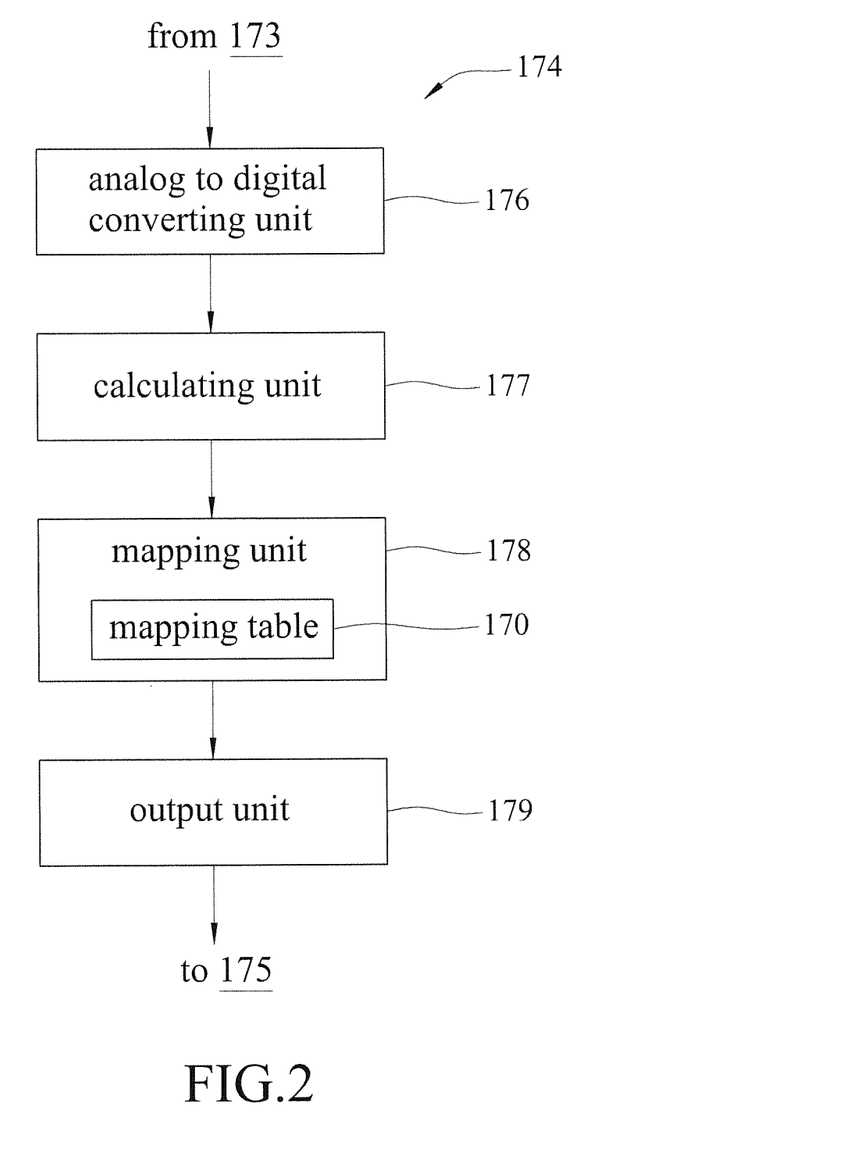
FIG. 2 is a schematic block diagram illustrating a processor of the first embodiment.

Referring to FIGS. 1 and 2, in this embodiment, the processor 174 includes an analog to digital converting unit 176, a calculating unit 177, a mapping unit 178 and an output unit 179. The analog to digital converting unit 176 is coupled to the voltage sensor 173, and converts the first and second analog signals from the voltage sensor 173 into a first digital output that indicates the input voltage (Vin) and a second digital output that indicates the voltage at the second terminal of the inductor 12. The calculating unit 177 is coupled to the analog to digital converting unit 176, and calculates a difference between the first and second digital outputs from the analog to digital converting unit 176. The difference indicates the output voltage (Vout). The mapping unit 178 is coupled to the calculating unit 177, and maps the difference from the calculating unit 177 to a duty ratio of the PWM signal, thereby generating an indication signal that indicates the duty ratio. The output unit 179 is coupled to the mapping unit 178 and the low-pass filter 175, and generates the PWM signal for the low-pass filter 175 based on the indication signal from the mapping unit 178.

In this embodiment, the mapping unit 178 pre-stores a predetermined mapping table 170 describing a relationship between the duty ratio of the PWM signal and the output voltage (Vout) indicated by the difference, and maps the difference to the duty ratio that is to be indicated by the indication signal based on the predetermined mapping table 170. An example of the predetermined mapping table 170 is shown in the following Table 1, where Vmax>V1>V2> . . . >Vn>Vmin. Preferably, the duty ratio of the PWM signal increases with decrease of the output voltage (Vout) i.e., D1<D2< . . . <Dn+1, and so does the feedback voltage (Vf).

TABLE 1

| Vout | Vmax~V1 | V1~V2 | . . . | Vn~Vmin |
|---|---|---|---|---|
| Duty ratio | D1 | D2 | . . . | Dn + 1 |

It is noted that the processor 174 may be a general purpose processor programmed to perform the functions of the analog to digital converting unit 176, the calculating unit 177, the mapping unit 178 and the output unit 179 in cooperation with hardware configurations. Alternatively, the processor 174 may be an application specific processor dedicated to perform the functions of the analog to digital converting unit 176, the calculating unit 177, the mapping unit 178 and the output unit 179.

Figure 3:
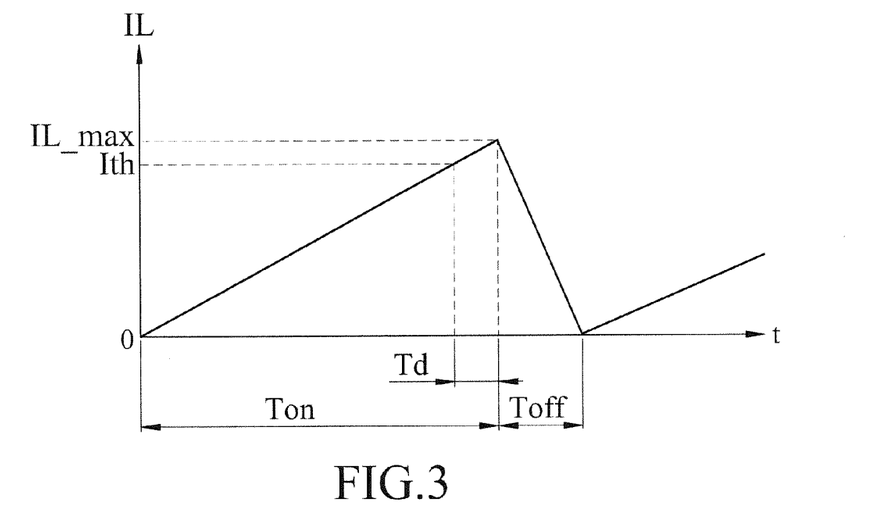
FIG. 3 is an exemplary timing diagram illustrating an inductor current of the first embodiment when an output voltage of the first embodiment is relatively large.
Figure 4:
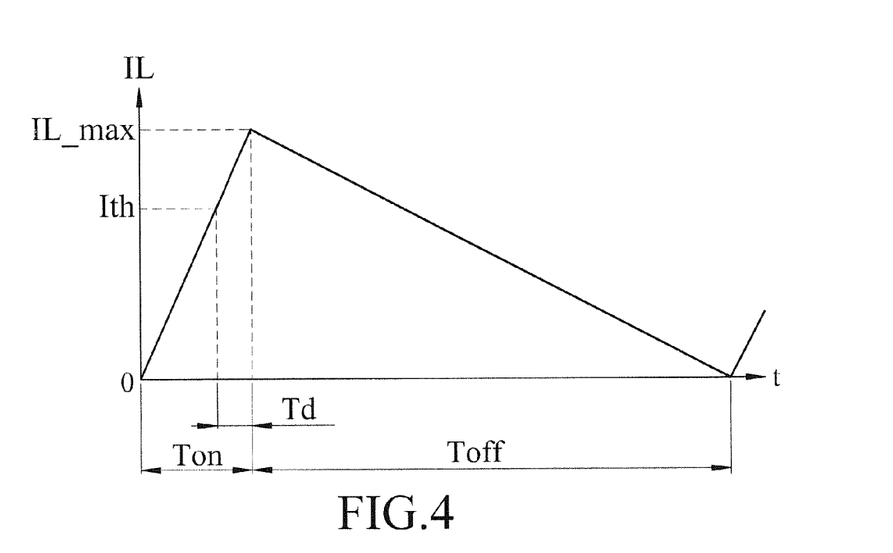
FIG. 4 is an exemplary timing diagram illustrating the inductor current of the first embodiment when the output voltage of the first embodiment is relatively small.

Referring to FIGS. 1, 3 and 4, operations of the driving circuit of this embodiment are described below. FIG. 3 illustrates the inductor current (IL) of this embodiment when the output voltage (Vout) of this embodiment is relatively large, and FIG. 4 illustrates the inductor current (IL) of this embodiment when the output voltage (Vout) of this embodiment is relatively small. Note that the slopes of current variation in FIGS. 3 and 4 are associated with the voltage across the load 9 (i.e., the output voltage (Vout)) according to the following equations:

Ton period: slope=(Vin−Vout)/L;

Toff period: slope=Vout/L, where L denotes an inductance of the inductor 12.

During each time period (Ton) when the switch 14 operates in the ON state, the inductor current (IL) increases gradually from zero, and flows further through the parallel connection of the capacitor 13 and the load 9, the switch 14 and the current sensing element 15. During each time period (Toff) when the switch 14 operates in the OFF state, the inductor current (IL) decreases gradually to zero, and flows further through the parallel connection of the capacitor 13 and the load 9, and the switching element 11.

Without compensation (i.e., the control pin of the controller 18 directly receives the sensed voltage (Vs), and the operation of the switch 14 is then controlled based on the sensed voltage (Vs)), a maximum of the inductor current (IL_max) can be expressed by the following equation:

$$IL\_max = Ith + (Vin - Vout) \times Td / L \quad \text{equation 1}$$
$$= Vref / Rcs + (Vin - Vout) \times Td / L.$$

In this equation, Ith denotes an inductor current when the sensed voltage (Vs) reaches the reference voltage, Vref denotes the reference voltage, and Rcs denotes a resistance of the current sensing element 15. An output current for driving the load 9 (i.e., the inductor current (IL)) has an average ($\overline{Iout}$) that equals IL_max/2.

As a result, when different output voltages Vout1, Vout2 (Vout1>Vout2) are applied to equation 1, variation of the average output current is equal to:

$$|\Delta IL\_max|/2 = |Td \times (Vout2 - Vout1)/L|/2.$$

On the other hand, in this embodiment, since the switch 14 is switched from the ON state to the OFF state when the compensated voltage (Vc) exceeds the reference voltage for the delay time (Td), the maximum of the inductor current (IL_max) can be expressed by the following equation:

$$IL\_max = Ith + (Vin - Vout) \times Td / L \quad \text{equation 2}$$
$$= (Vref - Vf) / Rcs + (Vin - Vout) \times Td / L,$$

where Ith denotes an inductor current when the compensated voltage (Vc) reaches the reference voltage, Vref denotes the reference voltage, Vf denotes the feedback voltage, and Rcs denotes the resistance of the current sensing element 15.

As a result, when different output voltages Vout1, Vout2 (Vout1>Vout2) are applied to equation 2, variation of the average output current is equal to:

$$|\Delta IL\_max|/2 = |(Vf2 - Vf1)/Rcs + Td \times (Vout2 - Vout1)/L|/2,$$

where Vf1 is the feedback voltage when the output voltage is Vout1, and Vf2 is the feedback voltage when the output voltage is Vout2.

Figure 5:
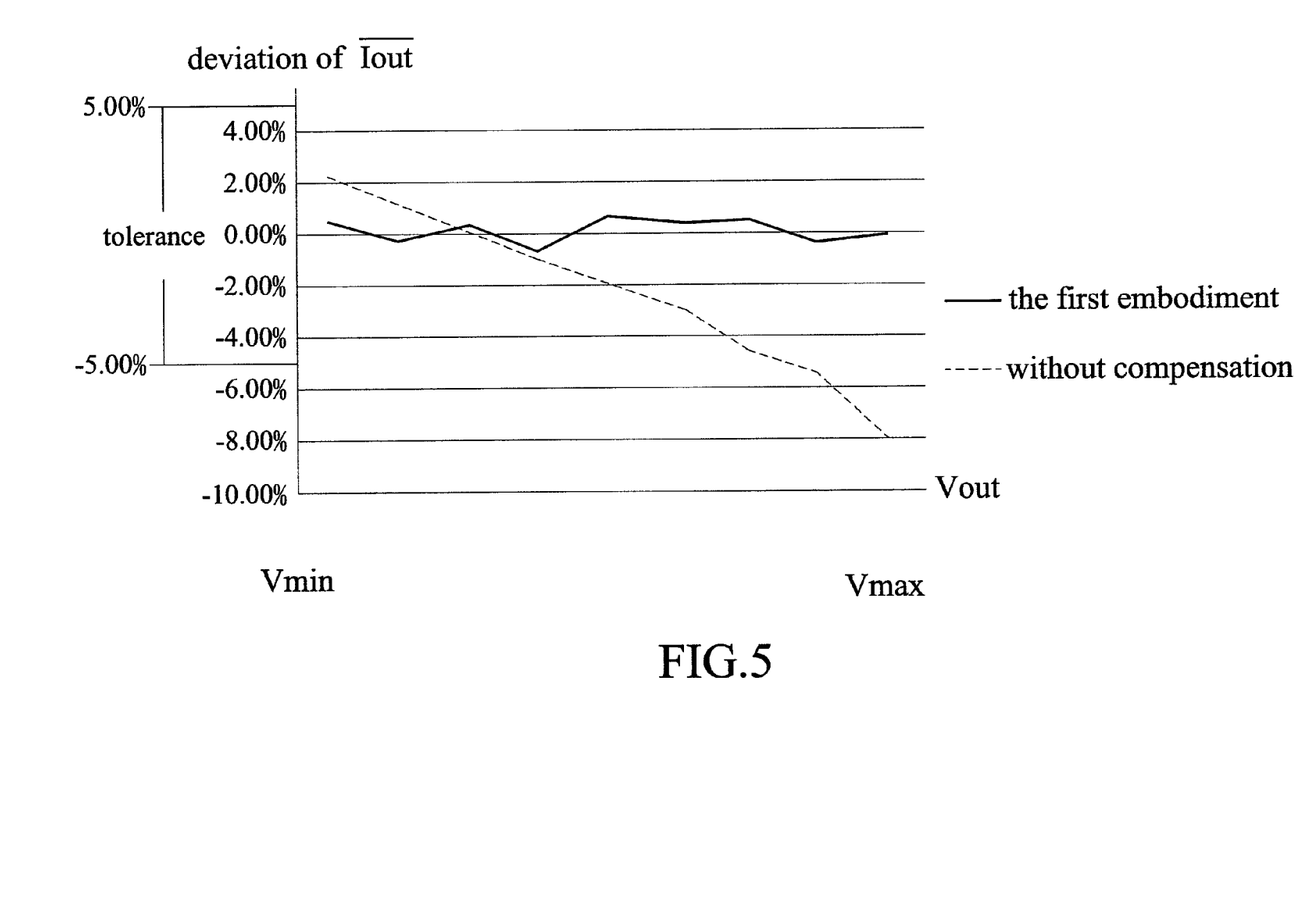
FIG. 5 is a schematic diagram illustrating a relationship between a deviation of an average of an output current and the output voltage for the first embodiment and the inverse buck driving circuit without compensation.

Note that Vf1<Vf2 since the greater output voltage Vout1 is mapped to a lower duty ratio of the PWM signal that corresponds to the feedback voltage Vf1. Accordingly, average output current variation between different output voltages is compensated, and is smaller than that without compensation. In other words, by introducing the feedback voltage (Vf) to compensate the sensed voltage (Vs), variations of the maximum of the inductor current (IL_max) and the average of the output current ($\overline{Iout}$) depending on the output voltage (Vout) can be reduced as shown in FIG. 5. Note that the deviations illustrated in FIG. 5 are calculated by setting a specific target value to be 0.0%, and the deviation of this embodiment is within a tolerance of, for example, ±5.0% when the output voltage (Vout) is within a voltage range from Vmin to Vmax.

Referring to FIGS. 1 and 2, it is noted that in other embodiments, the following modifications may be made to this embodiment:

1. The switching element 11 may be a switch, instead of a diode. In this case, the controller 18 is further coupled to the switching element 11, and controls operation of the switching element 11 between an ON state and an OFF state such that the switching element 11 operates in the OFF state when the switch 14 operates in the ON state, and such that the switching element 11 operates in the ON state when the switch 14 operates in the OFF state.

2. The capacitor 13 may be omitted.

Figure 6:
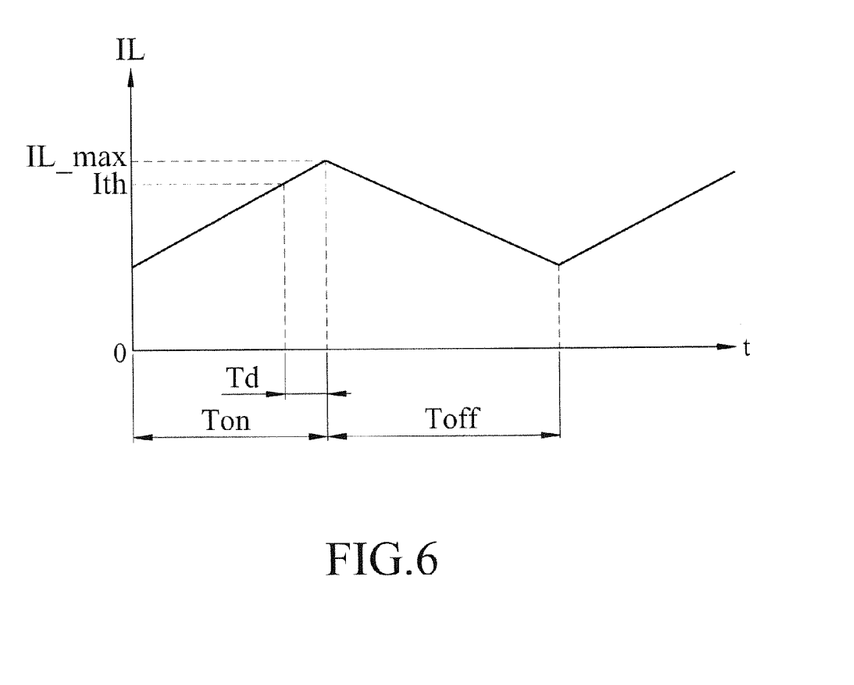
FIG. 6 is an exemplary timing diagram illustrating an inductor current of a modification of the first embodiment.

3. The switch 14 may be switched from the OFF state to the ON state when the sensed signal indicates that the inductor current (IL) reduces to a value greater than zero as shown in FIG. 6. In this case, the driving circuit operates in a continuous conduction mode (CCM).

4. The mapping unit 178 may map the difference to the duty ratio based on a predetermined mapping equation. In this case, the predetermined mapping table 170 is omitted.

Figure 7:
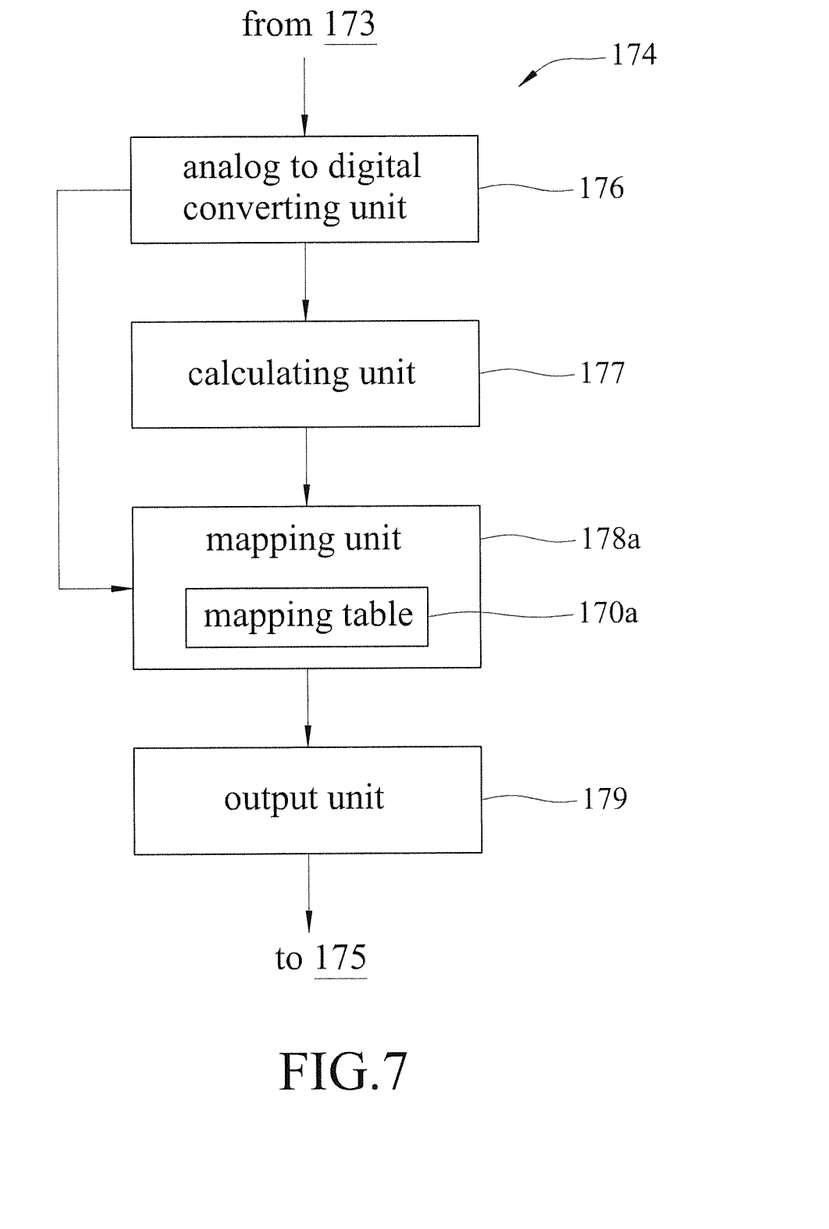
FIG. 7 is a schematic block diagram illustrating a processor of the second embodiment.

Referring to FIGS. 1 and 7, a second embodiment of an inverse buck driving circuit according to this disclosure is a modification of the first embodiment. Unlike the first embodiment, the mapping unit (178*a*) of the second embodiment is further coupled to the analog to digital converting unit 176, and maps the first digital output from the analog to digital converting unit 176 and the difference from the calculating unit 177 to a duty ratio that is to be indicated by the indication signal based on the predetermined mapping table (170*a*) that describes a relationship among the input voltage (Vin) indicated by the first digital output, the output voltage (Vout) indicated by the difference, and the duty ratio of the PWM signal. An example of the predetermined mapping table (170*a*) is shown in the following Table 2, where V1max>V11>V12> . . . >V1*n*>V1min and V2max>V21>V22> . . . >V2*m*>V2min.

TABLE 2

| Vin | Vout | | | |
|---|---|---|---|---|
| | V1max~V11 | V11~V12 | ... | V1n~V1min |
| V2max~V21 | D11 | D12 | ... | D1(n + 1) |
| V21~V22 | D21 | D22 | ... | D2(n + 1) |
| . | . | . | . | . |
| . | . | . | . | . |
| V2m~V2min | D(m + 1) 1 | D(m + 1) 2 | ... | D(m + 1) (n + 1) |

In this embodiment, it is known from equation 2 that by introducing the feedback voltage (Vf) to compensate the sensed voltage (Vs), variations of the maximum of the inductor current (IL_max) and the average of the output current ($\overline{Iout}$) depending on the input voltage (Vin) and the output voltage (Vout) can be reduced.

Figure 8:
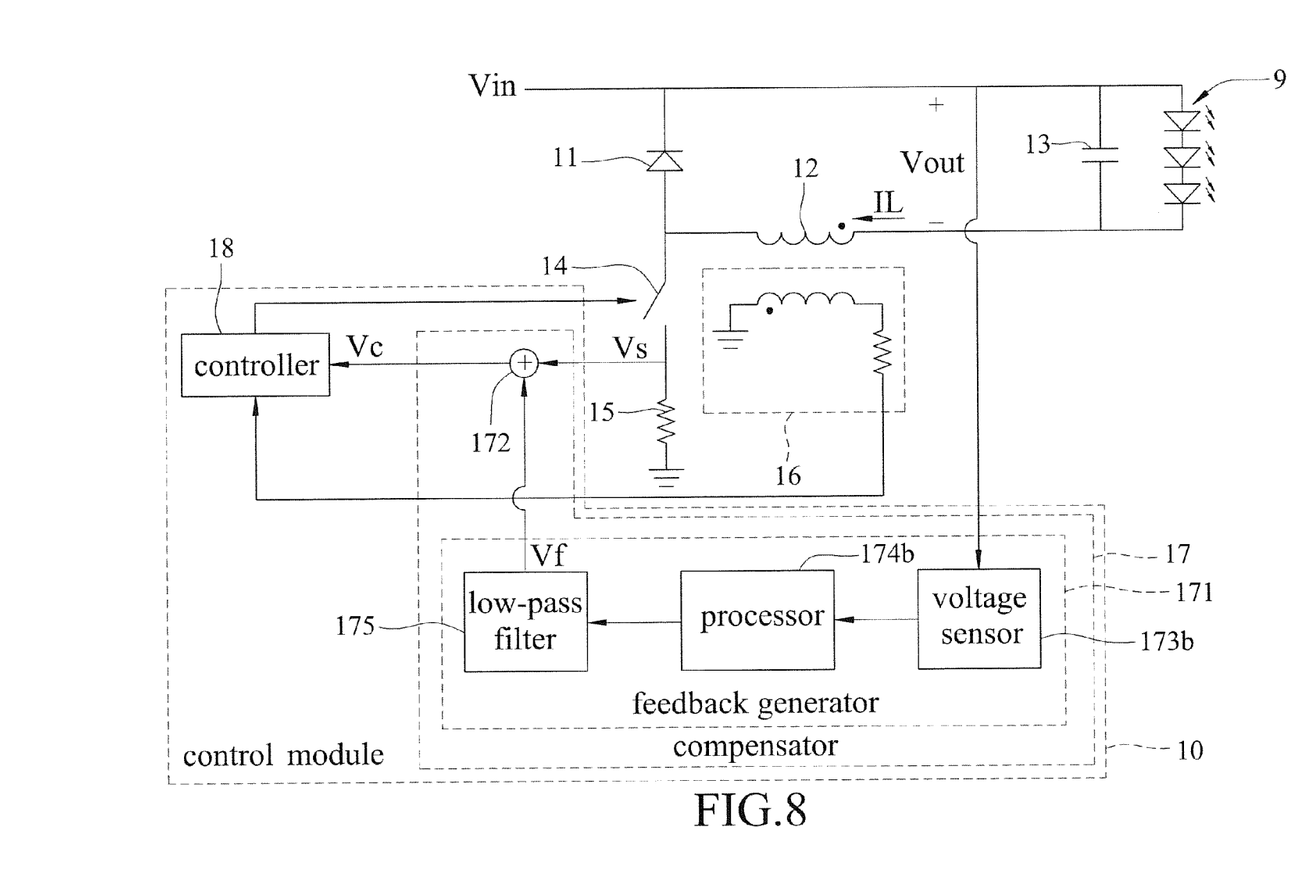
FIG. 8 is a schematic circuit block diagram illustrating a third embodiment of an inverse buck driving circuit according to this disclosure.
Figure 9:
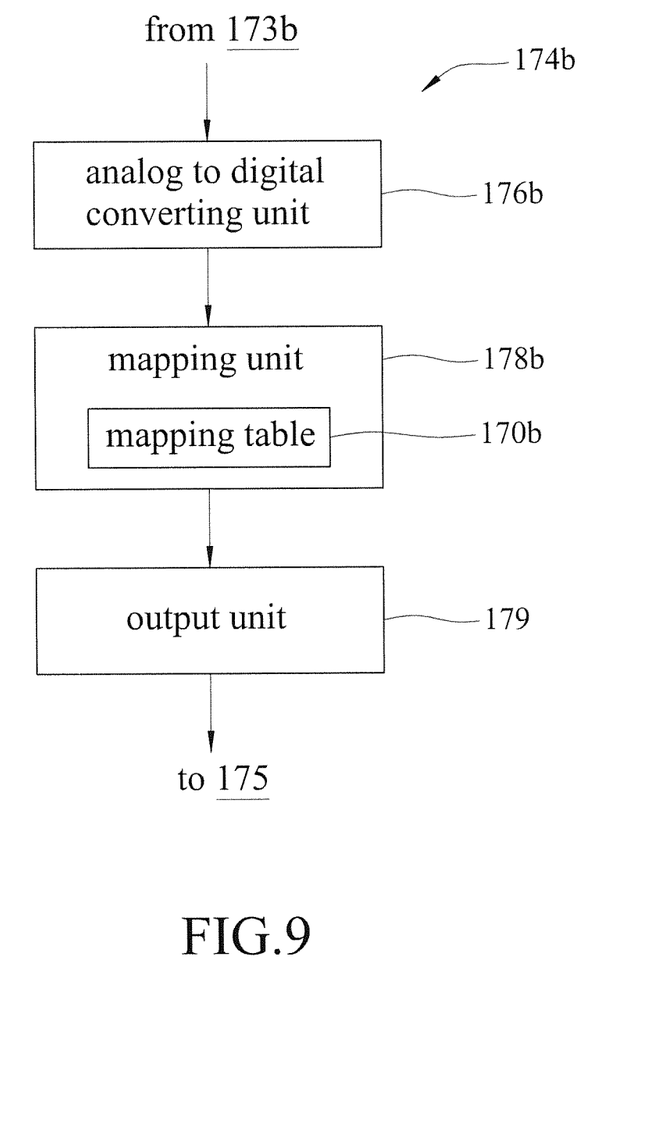
FIG. 9 is a schematic block diagram illustrating a processor of the third embodiment.

Referring to FIGS. 8 and 9, a third embodiment of an inverse buck driving circuit according to this disclosure is a modification of the first embodiment. Unlike the first embodiment, the voltage sensor (173*b*) of the third embodiment is only coupled to the first terminal of the switching element 11, and senses the input voltage (Vin) to generate an analog signal that indicates the input voltage (Vin). In addition, the processor (174b) of the third embodiment does not include the calculating unit 177 (see FIG. 2). The analog to digital converting unit (176b) of the processor (174b) converts the analog signal from the voltage sensor (173b) into a digital output that indicates the input voltage (Vin). The mapping unit (178b) of the processor (174b) is coupled to the analog to digital converting unit (176b), and maps the digital output from the analog to digital converting unit (176b) to a duty ratio that is to be indicated by the indication signal based on the predetermined mapping table (170b) that describes a relationship between the input voltage (Vin) indicated by the digital output and the duty ratio of the PWM signal. An example of the predetermined mapping table (170b) is shown in the following Table 3, where Vmax>V1>V2> . . . >Vm>Vmin. Preferably, the duty ratio of the PWM signal decreases with decrease of the input voltage (Vin), i.e., D1>D2> . . . >Dm+1, and so does the feedback voltage (Vf).

TABLE 3

| Vin | Vmax~V1 | V1~V2 | . . . | Vm~Vmin |
|---|---|---|---|---|
| Duty ratio | D1 | D2 | . . . | Dm + 1 |

In this embodiment, it is known from equation 2 that by introducing the feedback voltage (Vf) to compensate the sensed voltage (Vs), variations of the maximum of the inductor current (IL) and the average of the output current ($\overline{Iout}$) depending on the input voltage (Vin) can be reduced.

Figure 10:
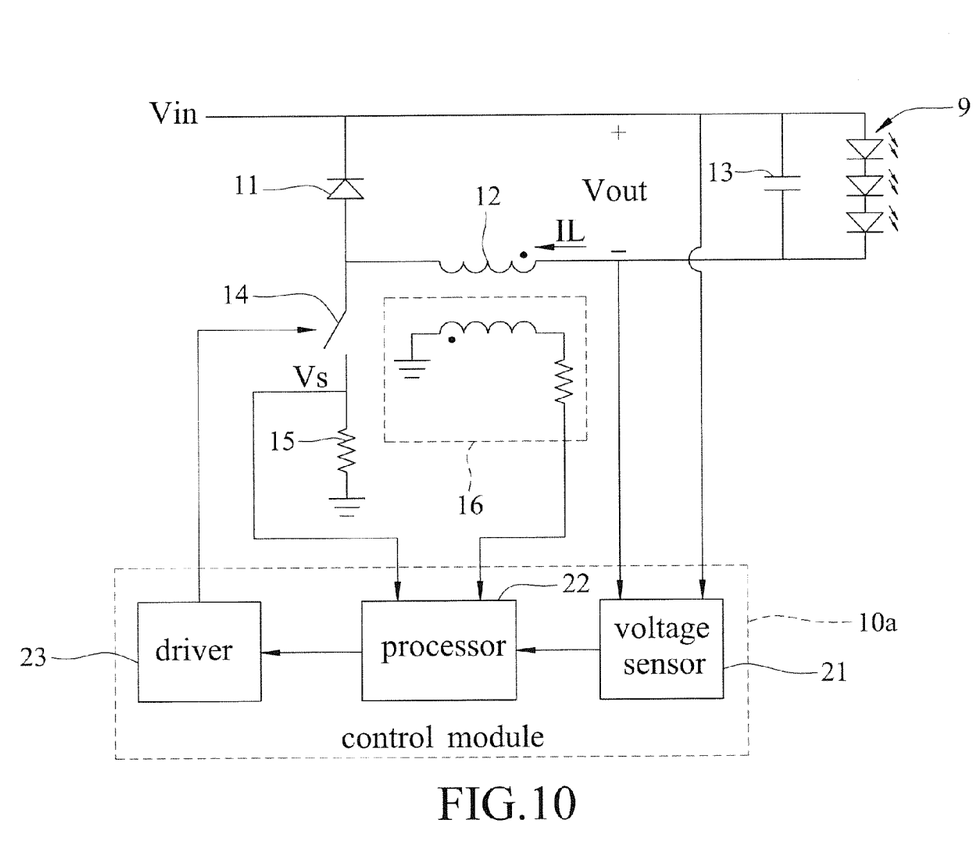
FIG. 10 is a schematic circuit block diagram illustrating a fourth embodiment of an inverse buck driving circuit according to this disclosure.

Referring to FIG. 10, a fourth embodiment of an inverse buck driving circuit according to this disclosure is a modification of the first embodiment. Unlike the first embodiment, the control module (10a) of the fourth embodiment includes a voltage sensor 21, a processor 22 and a driver 23.

The voltage sensor 21 is coupled to the first terminal of the switching element 11 and the second terminal of the inductor 12, and senses the input voltage (Vin) and the voltage at the second terminal of the inductor 12 to generate a first analog signal that indicates the input voltage (Vin) and a second analog signal that indicates the voltage at the second terminal of the inductor 12.

The processor 22 is coupled to the voltage sensor 21, the current sensing element 15 and the current sensor 16, compensates, based on the first and second analog signals from the voltage sensor 21, the sensed voltage from the current sensing element 15 to generate a compensated value as the compensated signal, and generates a PWM signal that switches from a first state (e.g., one of a logic low level and a logic high level) to a second state (e.g., the other of the logic low level and the logic high level) when the compensated value exceeds a reference value serving as the reference threshold for a delay time, and that switches from the second state to the first state upon being triggered by the sensed signal from the current sensor 16.

In this embodiment, the compensated value is obtained by: converting the first and second analog signals and the sensed voltage (Vs) into a first digital output that indicates the input voltage (Vin), a second digital output that indicates the voltage at the second terminal of the inductor 12, and a third digital output that indicates the sensed voltage (Vs); calculating a difference between the first and second digital outputs, which indicates the output voltage (Vout); generating a feedback value based on the difference; and adding up the third digital output and the feedback value to generate the compensated value. Preferably, the feedback value increases with decrease of the output voltage (Vout).

The driver 23 is coupled to the processor 22 and the switch 14, and drives the switch 14 to operate in the ON state when the PWM signal from the processor 22 is in the first state, and to operate in the OFF state when the PWM signal is in the second state.

In this embodiment, by introducing the feedback value to compensate the third digital output that indicates the sensed voltage (Vs), variations of the maximum of the inductor current (IL) and the average of the output current ($\overline{Iout}$) depending on the output voltage (Vout) can be reduced.

While this invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A driving circuit comprising:
a switching element having a first terminal adapted to receive an input voltage, and a second terminal;
an inductor having a first terminal coupled to said second terminal of said switching element, and a second terminal;
a switch and a current sensing element coupled in series between said second terminal of said switching element and a reference node, said current sensing element sensing a current flowing through said switch to generate a sensed voltage; and
a control module coupled to at least one of said first terminal of said switching element and said second terminal of said inductor and to said current sensing element and said switch, compensating the sensed voltage based on at least one of the input voltage and an output voltage across said switching element and said inductor to generate a compensated signal, and switching said switch from an ON state to an OFF state when the compensated signal exceeds a reference threshold for a delay time.

2. The driving circuit of claim 1, wherein said switching element is a diode that has an anode serving as said second terminal of said switching element, and a cathode serving as said first terminal of said switching element.

3. The driving circuit of claim 1, further comprising a capacitor coupled between said first terminal of said switching element and said second terminal of said inductor.

4. The driving circuit of claim 1, wherein said control module includes:
a voltage sensor coupled to said first terminal of said switching element and said second terminal of said inductor, and sensing the input voltage and a voltage at said second terminal of said inductor to generate a first analog signal that indicates the input voltage and a second analog signal that indicates the voltage at said second terminal of said inductor;
a processor coupled to said voltage sensor and said current sensing element, compensating, based on the first and second analog signals from said voltage sensor, said sensed voltage from said current sensing element to generate a compensated value as the compensated signal, and generating a PWM signal that switches from a first state to a second state when the compensated value exceeds a reference value serving as the reference threshold for the delay time; and a driver coupled to said processor and said switch, and driving said switch to operate in the ON state when the PWM signal from said processor is in the first state, and to operate in the OFF state when the PWM signal is in the second state.

5. A control method for controlling a driving circuit, the driving circuit including a switching element, an inductor and a switch that are coupled to each other in a Y shape, and a current sensing element that is coupled to the switch in series and that senses a current flowing through the switch to generate a sensed voltage, the switching element receiving an input voltage, said control method comprising:
 compensating the sensed voltage based on at least one of the input voltage and an output voltage across the switching element and the inductor to generate a compensated signal; and
 switching the switch from the ON state to the OFF state when the compensated signal exceeds a reference threshold for a delay time.

6. The control method of claim 5, wherein the step of compensating the sensed voltage includes:
 generating a feedback voltage based on the at least one of the input voltage and the output voltage; and
 adding up the sensed voltage and the feedback voltage to generate a compensated voltage as the compensated signal.

7. The control method of claim 6, wherein the step of generating the feedback voltage includes:
 generating a pulse width modulated (PWM) signal based on the at least one of the input voltage and the output voltage; and
 low-pass filtering the PWM signal to generate the feedback voltage.

8. The control method of claim 7, wherein the PWM signal is generated based further on a predetermined mapping table that describes a relationship between the at least one of the input voltage and the output voltage, and a duty ratio of the PWM signal.

9. A driving circuit comprising:
 a switching element having a first terminal adapted to receive an input voltage, and a second terminal;
 an inductor having a first terminal coupled to said second terminal of said switching element, and a second terminal;
 a switch and a current sensing element coupled in series between said second terminal of said switching element and a reference node, said current sensing element sensing a current flowing through said switch to generate a sensed voltage; and
 a control module coupled to at least one of said first terminal of said switching element and said second terminal of said inductor and to said current sensing element and said switch; wherein said control module includes:
 a compensator coupled to the at least one of said first terminal of said switching element and said second terminal of said inductor and to said current sensing element, and compensating the sensed voltage based on at least one of the input voltage and an output voltage to generate a compensated voltage; and
 a controller coupled to said switch and said compensator, and switching said switch from an ON state to an OFF state when the compensated voltage from said compensator exceeds a reference voltage for a delay time.

10. The driving circuit of claim 9, wherein said compensator includes:

a feedback generator coupled to the at least one of said first terminal of said switching element and said second terminal of said inductor, and generating a feedback voltage based on the at least one of the input voltage and the output voltage; and
 a voltage adder coupled to said current sensing element, said feedback generator and said controller, and adding up the sensed voltage and the feedback voltage to generate the compensated voltage for said controller.

11. The driving circuit of claim 10, wherein said feedback generator includes:
 a voltage sensor coupled to said first terminal of said switching element and said second terminal of said inductor, and sensing the input voltage and a voltage at said second terminal of said inductor to generate a first analog signal that indicates the input voltage and a second analog signal that indicates the voltage at said second terminal of said inductor;
 a processor coupled to said voltage sensor, and generating a pulse width modulated (PWM) signal based on the first and second analog signals from said voltage sensor; and
 a low-pass filter coupled to said processor and said voltage adder, and filtering the PWM signal from said processor to generate the feedback voltage for said voltage adder.

12. The driving circuit of claim 11, wherein said processor includes:
 an analog to digital converting unit coupled to said voltage sensor, and converting the first and second analog signals from said voltage sensor into a first digital output that indicates the input voltage and a second digital output that indicates the voltage at said second terminal of said inductor;
 a calculating unit coupled to said analog to digital converting unit, and calculating a difference between the first and second digital outputs from said analog to digital converting unit, the difference indicating the output voltage;
 a mapping unit coupled to said calculating unit, mapping the difference from said calculating unit to a duty ratio of the PWM signal, and generating an indication signal that indicates the duty ratio thus mapped; and
 an output unit coupled to said mapping unit and said low-pass filter, and generating the PWM signal for said low-pass filter based on the indication signal from said mapping unit.

13. The driving circuit of claim 12, wherein said mapping unit pre-stores a predetermined mapping table describing a relationship between the output voltage and the duty ratio of the PWM signal, and maps the difference to the duty ratio based on the predetermined mapping table.

14. The driving circuit of claim 12, wherein the duty ratio of the PWM signal increases with decrease of the output voltage.

15. The driving circuit of claim 11, wherein said processor includes:
 an analog to digital converting unit coupled to said voltage sensor, and converting the first and second analog signals from said voltage sensor into a first digital output that indicates the input voltage and a second digital output that indicates the voltage at said second terminal of said inductor;
 a calculating unit coupled to said analog to digital converting unit, and calculating a difference between the first and second digital outputs from said analog to digital converting unit, the difference indicating the output voltage;

a mapping unit coupled to said analog to digital converting unit and said calculating unit, mapping the first digital output from said analog to digital converting unit and the difference from said calculating unit to a duty ratio of the PWM signal, and generating an indication signal that indicates the duty ratio thus mapped; and an output unit coupled to said mapping unit and said low-pass filter, and generating the PWM signal for said low-pass filter based on the indication signal from said mapping unit.

16. The driving circuit of claim 15, wherein said mapping unit pre-stores a predetermined mapping table describing a relationship among the input voltage, the output voltage and the duty ratio of the PWM signal, and maps the first digital output and the difference to the duty ratio based on the predetermined mapping table.

17. The driving circuit of claim 10, wherein said feedback generator includes:

a voltage sensor coupled to said first terminal of said switching element, and sensing the input voltage to generate an analog signal that indicates the input voltage;

a processor coupled to said voltage sensor, and generating a PWM signal based on the analog signal from said voltage sensor; and a low-pass filter coupled to said processor and said voltage adder, and filtering the PWM signal from said processor to generate the feedback voltage for said voltage adder.

18. The driving circuit of claim 17, wherein said processor includes:

an analog to digital converting unit coupled to said voltage sensor, and converting the analog signal from said voltage sensor into a digital output that indicates the input voltage;

a mapping unit coupled to said analog to digital converting unit, mapping the digital output from said analog to digital converting unit to a duty ratio of the PWM signal, and generating an indication signal that indicates the duty ratio thus mapped; and an output unit coupled to said mapping unit and said low-pass filter, and generating the PWM signal for said low-pass filter based on the indication signal from said mapping unit.

19. The driving circuit of claim 18, wherein said mapping unit pre-stores a predetermined mapping table describing a relationship between the input voltage and the duty ratio of the PWM signal, and maps the digital output to the duty ratio based on the predetermined mapping table.

20. The driving circuit of claim 17, wherein said low-pass filter is an RC low-pass filter.

* * * * *